(12) United States Patent
Junk et al.

(10) Patent No.: US 12,473,391 B2
(45) Date of Patent: Nov. 18, 2025

(54) GAS SEPARATION ARTICLES COMPOSED OF AMORPHOUS FLUORINATED COPOLYMERS OF DIOXOLANES AND OTHER FLUORINATED RING MONOMERS AND METHODS OF MAKING AND USING THEREOF

(71) Applicant: Chromis Fiberoptics, Inc., Warren, NJ (US)

(72) Inventors: Christopher P. Junk, Wilmington, DE (US); Whitney Ryan White, Watchung, NJ (US)

(73) Assignee: Chromis Fiberoptics, Inc., Warren, NJ (US)

( * ) Notice: Subject to any disclaimer, the term of this patent is extended or adjusted under 35 U.S.C. 154(b) by 735 days.

(21) Appl. No.: 17/663,897

(22) Filed: May 18, 2022

(65) Prior Publication Data

US 2022/0403083 A1 Dec. 22, 2022

Related U.S. Application Data

(60) Provisional application No. 63/189,979, filed on May 18, 2021.

(51) Int. Cl.
*B01D 53/22* (2006.01)
*B01D 71/32* (2006.01)
*C08F 234/02* (2006.01)

(52) U.S. Cl.
CPC .......... *C08F 234/02* (2013.01); *B01D 53/228* (2013.01); *B01D 71/32* (2013.01)

(58) Field of Classification Search
CPC ...... C08F 234/02; B01D 53/228; B01D 71/32
See application file for complete search history.

(56) References Cited

U.S. PATENT DOCUMENTS

| | | |
|---|---|---|
| 4,863,761 A | 9/1989 | Puri |
| 5,051,114 A | 9/1991 | Nemser et al. |
| 5,141,642 A | 8/1992 | Kusuki et al. |
| 5,156,888 A | 10/1992 | Haubs et al. |
| 5,242,636 A | 9/1993 | Sluma et al. |
| 5,318,417 A | 6/1994 | Kopp et al. |

(Continued)

OTHER PUBLICATIONS

International Search Report dated Sep. 27, 2022 in co-pending PCT patent application No. PCT/US2022/029745.

(Continued)

*Primary Examiner* — Anthony R Shumate
(74) *Attorney, Agent, or Firm* — Thomas | Horstemeyer, LLP

(57) ABSTRACT

Described herein are articles for separating gases. The article includes an amorphous fluorinated copolymer containing one or more types of fluorinated dioxolane ring monomers, and one or more types of fluorinated non-dioxolane ring monomers, optionally with crosslinking between the fluorinated copolymer chains. The copolymers of fluorinated dioxolane ring monomers and fluorinated non-dioxolane ring monomers show a large differential in the permeability of certain gases compared with other gases. The resulting polymer membranes have superior selectivity and reliability performance in certain gas separations compared with previous compositions known to the art. Methods for making and using the article described are also provided.

47 Claims, 3 Drawing Sheets

$CO_2 + CH_4$

↓

| selective layer | → $CH_4$ (retentate) |

↓

$CO_2$ (permeate)

(56) References Cited

U.S. PATENT DOCUMENTS

| | | | |
|---|---|---|---|
| 6,361,582 B1* | 3/2002 | Pinnau | B01D 53/228 95/55 |
| 6,361,583 B1 | 3/2002 | Pinnau et al. | |
| 6,544,316 B2* | 4/2003 | Baker | B01D 71/44 95/55 |
| 6,572,679 B2* | 6/2003 | Baker | B01D 71/44 95/55 |
| 6,579,341 B2* | 6/2003 | Baker | B01D 69/02 95/52 |
| 6,592,650 B2* | 7/2003 | Pinnau | B01D 69/02 95/55 |
| 6,896,717 B2* | 5/2005 | Pinnau | B01D 53/228 95/55 |
| 8,828,121 B1 | 9/2014 | He et al. | |
| 9,636,632 B2 | 5/2017 | Merkel et al. | |
| 9,975,084 B2 | 5/2018 | Merkel et al. | |
| 10,022,677 B2 | 7/2018 | He et al. | |
| 2013/0014643 A1* | 1/2013 | Lokhandwala | C10L 3/101 95/50 |
| 2014/0107388 A1* | 4/2014 | Lokhandwala | C10L 3/101 585/818 |
| 2017/0259204 A1* | 9/2017 | Merkel | C10L 3/104 |
| 2021/0316255 A1* | 10/2021 | Junk | B01D 53/228 |
| 2021/0317329 A1* | 10/2021 | Junk | C08F 234/02 |
| 2023/0211282 A1* | 7/2023 | Junk | B01D 53/228 95/45 |

OTHER PUBLICATIONS

Li et al., "Volumetric Properties and Sorption Behavior of Perfluoropolymers with Dioxolane Pending Rings", Ind. Eng. Chem. Res. 2020, vol. 59, pp. 5276-5286.

Yavari et al., "Dioxolane-Based Perfluoropolymers with Superior Membrane Gas Separation Properties", Macromolecules, 2018, vol. 51, pp. 2489-2497.

Okamoto et al., "New amorphous perfluoro polymers: perfluorodioxolane polymers for use as plastic optical fibers and gas separation membranes", Polym. Adv. Technol., 2016, vol. 27, pp. 33-41.

* cited by examiner

GAS SEPARATION ARTICLES COMPOSED OF AMORPHOUS FLUORINATED COPOLYMERS OF DIOXOLANES AND OTHER FLUORINATED RING MONOMERS AND METHODS OF MAKING AND USING THEREOF

CROSS REFERENCE TO RELATED APPLICATIONS

This application claims the benefit of U.S. Provisional Application No. 63/189,979 filed on May 18, 2021, which is incorporated herein by reference in its entirety.

BACKGROUND

Separation of $CO_2$ and chemically similar gases (including $H_2S$ and other water-soluble acid gases) from non-polar gases, including $N_2$, $O_2$, methane, and other hydrocarbons is an important industrial problem. One large-scale application for this type of separation is the decarbonization of effluent gases ("flue gases") in power plants and other combustion devices, which is important for reduction of $CO_2$ emissions related to global warming. Another major application for this type of gas separation is removal of corrosive acid gases, including $CO_2$ and $H_2S$, from a natural gas stream, also known as "natural gas sweetening," There are also a number of important problems that involve the separation of non-acid types of gases, especially including fluorinated refrigerants, for which separation of gases with different global warming potential (GWP) is becoming a significant goal in the effort to reduce climate change.

These types of acid gas separations have historically been accomplished by a variety of methods, including chemical absorption, cryogenic distillation, and membrane separation. Chemical absorption has been extensively developed in the oil and gas industries with "amine scrubbing" technology, in which alkyl amines (such as mono-ethanolamine) form chemical complexes with acid gases, thus removing them from the gas stream [see for example, Bahadori, *Natural Gas Processing: Technology and Engineering Design*, Elsevier, Amsterdam, 2014]. Cryogenic distillation operates on the principle that $CO_2$ has a much higher freezing point than most other combustion effluents (principally nitrogen), so it may be frozen out as a liquid or a solid, leaving, the other gases to pass through the system [see for example, Xu, et. al "An Improved $CO_2$ Separation and Purification System Based on Cryogenic Separation and Distillation Theory" *Energies* 2014, 7, 3484-35021]. Although both chemical absorption and cryogenic distillation are effective methods of capturing $CO_2$, they typically require significant energy input and considerable capital equipment. In the case of alkylamine absorption processes, the amines are typically corrosive and toxic liquids. Also, since these amines have limited functional lifetimes, they must be regularly replaced and properly disposed of. This represents a significant burden in remote operating locations, such as offshore platforms. Consequently, simpler, more energy efficient, and longer-lasting separation methods are desired.

Fluorinated refrigerant gases are typically separated by distillation, which is depends on differences in the boiling point and vapor pressure of the components as the primary separation mechanism. In some cases, however, there are important separation problems wherein the components are azeotropic, or near-azeotropic, so that distillation-based separation methods are impractical. For example, the widely used refrigerant R410a consists of an azeotropic mixture of two components: R32, which has relatively low global warming potential, and R125, which has relatively high global warming potential. In such a case, it is desirable to separate the lower-GWP component for reuse, while separating the higher-GWP component for incineration or other forms of disposal.

Membrane-based gas separation methods operate on the principle of differential permeability of gases through the selective layer of a membrane, which is often composed of polymers. The membrane material in such a separation process is chosen to provide a very high permeability for one or more of the gases, while providing a much lower permeability for the other gases. The mixed gas stream is then introduced on one side of the membrane, and the high permeability gases pass preferentially through the membrane, resulting in a "permeate" gas stream on the other side of the membrane. This permeate stream will be enriched in the high-permeability gases compared with the input gas stream. Meanwhile as the input stream proceeds across the input-side surface of the membrane to the exit of the membrane module, it will become enriched in low-permeability species compared with the input gas stream. This stream is referred to as the "retentate" stream [see for example, Baker, *Membrane Technology and Applications*, Wiley, West Sussex, 2012].

Because this membrane-based separation requires only a pressure differential across the membrane to operate, it can be accomplished with relatively simple and reliable equipment, typically consisting primarily of a compressor and a membrane module. For the same reason, it typically uses far less power than the above methods of gas separation. Moreover, membrane based methods of gas separation avoid the use of toxic and corrosive materials such as alkyl amines often used in chemical absorption methods, and they typically offer a considerably lower capital cost as well.

Also, since membrane-based separation methods separate components on the basis of their differential permeability in a polymer membrane, their separation characteristics are typically quite different from the separation characteristics of a distillation process. Thus, azeotropic mixtures in which the component gases have substantially different membrane permeabilities may be separable by a membrane method, when they are inseparable by a distillation method. Accordingly, membranes-based separation methods are potentially promising separation methods for certain azeotropic and near-azeotropic mixtures of refrigerants or other gases.

The membranes most commonly used in gas separations are hydrocarbon polymers, including cellulose acetate and polyimides for separation of acid gases from methane [see for example, Xuezhong He in *Encyclopedia of Membranes*, Springer-Verlag, Berlin Heidelberg 2015]. While these hydrocarbon membranes typically display a relatively high selectivity under ideal conditions, their performance is degraded considerably in certain applications by absorbed gases, which can chemically degrade the polymer and/or cause plasticization of the polymer membranes. In the case of natural gas sweetening applications, $CO_2$ is known to plasticize cellulose acetate and polyimide membranes, resulting in reduced $CO_2$ permeability and reduced $CO_2$/$CH_4$ selectivity [Ibid]. This problem typically becomes more acute at elevated pressure and $CO_2$ content.

SUMMARY

Described herein are articles for separating gases. The article includes an amorphous fluorinated copolymer containing at least one fluorinated dioxolane ring monomer and one other fluorinated ring monomer such as, for example, cyclic fluorinated vinyl ethers. The resulting amorphous fluorinated copolymer membranes have superior selectivity and reliability performance compared with previous compositions known to the art. Methods for making and using the article described are also provided.

Other methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure swan be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
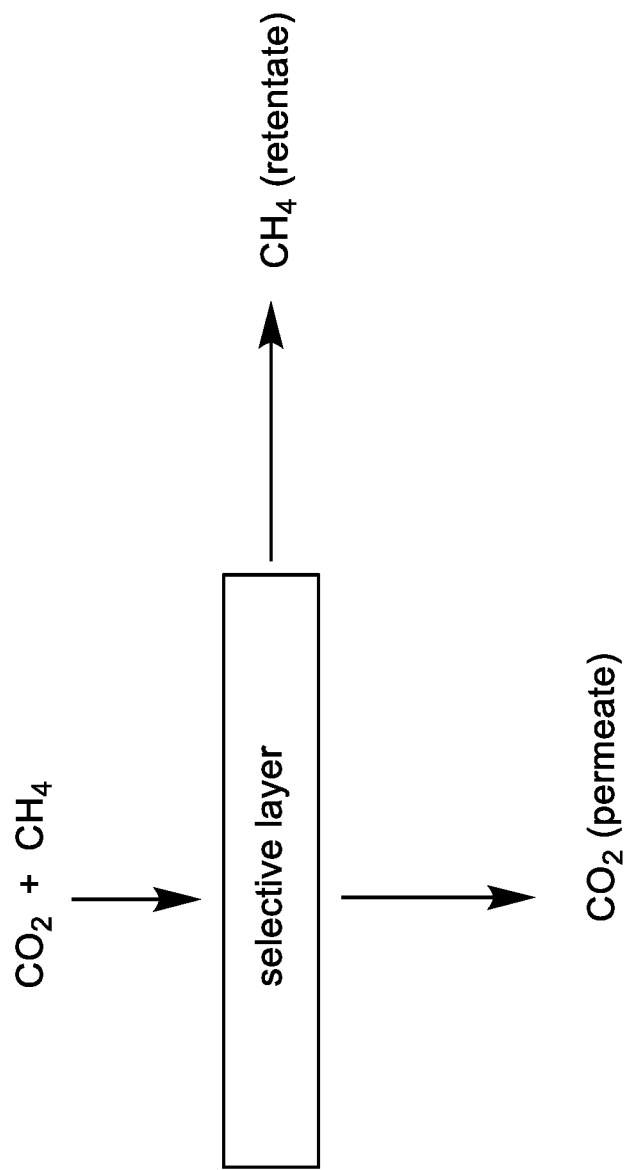
FIG. 1 shows an exemplary process for using the copolymers described herein for separating a targeted gas from a gaseous mixture.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms 'optional' or "optionally" means that the subsequently described event or circumstance can or cannot occur, and that the description includes instances where said event or circumstance occurs and instances where it does not.

As used in the specification and the appended claims, the singular forms and "the" include plural referents unless the context dearly dictates otherwise. Thus, for example, reference to "a fluorinated ring monomer," "a comonomer," or "a copolymer," include, but are not limited to, mixtures or combinations of two or more such fluorinated ring monomers, comonomers, or copolymers, and the like.

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "highly fluorinated" as used herein means that at least 50% of the available hydrogen bonded to carbon have been replaced by fluorine.

The terms "fully-fluorinated" and "perfluorinated" as used herein are interchangeable and refer to a compound where all of the available hydrogens bonded to carbon have been replaced with fluorine atoms.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl. C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

The term "alkenyl" or "olefinic" as used herein is a fluorocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene or olefin is present, or it can be explicitly indicated by the bond symbol C=C. In one aspect, an "alkenyl" or "olefinic" compound can include two carbon-carbon double bonds (e.g., is a diene).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', 'less than y', and 'less than z'. Likewise, the phrase 'about x, y, z, or greater' should be interpreted to include the specific ranges of 'about x', 'about y', and 'about z' as well as the ranges of 'greater than x', greater than y' and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

All percentages herein are by volume unless otherwise stated. Unless otherwise specified, temperatures referred to herein are based on atmospheric pressure (i.e. one atmosphere).

Described herein are separation articles such as, for example, films, membranes and the like separating at least one component from a gaseous mixture comprising two or more components.

Amorphous Fluorinated Copolymers

The separation articles described herein include one or more amorphous fluorinated copolymers comprising both fluorinated dioxolane ring units and fluorinated non-dioxolane ring monomers. Optionally, said copolymer may be crosslinked. In one aspect, the amorphous fluorinated copolymer comprises a plurality of dioxolane units, a plurality of non-dioxolane units, and optionally, a plurality of crosslinker units covalently bonded to the first polymers. In one aspect, the amorphous fluorinated copolymer is produced by (a) copolymerizing one or more fluorinated ring monomers and one or more non-dioxolane fluorinated ring monomers, optionally with a crosslinker in the amount of from 0.1 mol % to 20 mol % to produce a first copolymer and (b) if a crosslinker is present, crosslinking the first copolymer to produce the amorphous crosslinked fluoropolymer. Described below are the components and methods for making the crosslinked copolymers.

Fluorinated Dioxolane Ring Monomers

In one aspect, the amorphous fluorinated copolymers are produced from one more different fluorinated dioxolane ring monomers. In one aspect, the fluorinated dioxolane ring monomer includes a five-membered ring containing two oxygen atoms with an exocyclic double bond. In another aspect, the fluorinated dioxolane ring monomer contains a five-membered ring having an exocyclic double bond and containing two oxygens and a six-membered ring; or includes two five-membered rings, with one containing two oxygens and having an exocyclic double bond. Further in this aspect, when the fluorinated dioxolane ring monomer contains two rings, the rings can be fused to form a bicyclic structure. In another aspect, the fluorinated dioxolane ring monomer can be perfluorinated. In one aspect, representative fluorinated dioxolane ring monomers include, but are not limited to, to one or more olefinic compounds shown in Scheme 1 below, as well as combinations thereof Scheme 1: fluorinated dioxolane ring monomers

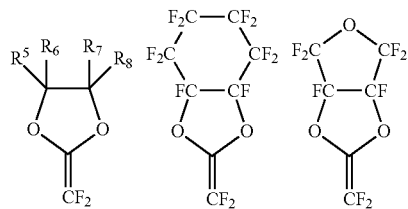

in which:
R$_5$, R$_6$, R$_7$, and R$_8$ are independently F, CF$_3$, or CF$_2$CF$_3$, CF$_2$H, CF$_2$CF$_2$H, CFHCF$_3$, CFHCF$_2$H and R$_6$ and R$_7$ can be contained within a 5- or 6-membered ring In one aspect, the fluorinated dioxolane has the structure below, where R$^5$, R$^6$, and R$^7$ are F and R$^8$ is CF$_3$.

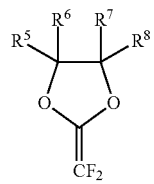

Fluorinated Non-Dioxolane Ring Monomers

In another aspect, the fluorinated non-dioxolane ring monomer care have an olefinic structure, where the monomer possesses one or more carbon-carbon double bonds. In another aspect, the fluorinated non-dioxolane ring monomer can be a conjugated or non-conjugated diene. In one aspect, representative fluorinated ring monomers include, but are not limited to, to one, or more olefinic compounds shown in Scheme 2 below as well as combinations thereof In another aspect, the fluorinated ring monomer can include one or more acyclic monomers that, upon polymerization, produce a fluorinated ring. For example, the third structure depicted in Scheme 2 can cyclize upon polymerization to produce a five-membered ring.

Scheme 2: fluorinated non-dioxolane ring monomers

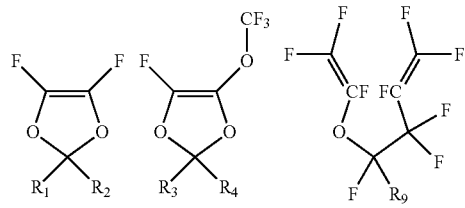

R$_1$ and R$_2$ are independently F, CF$_3$, CF$_2$CF$_3$, CF$_2$H, CF$_2$CF$_2$H, CFHCF$_3$, CFHCF$_2$H;

R$_3$ and R$_4$ are independently F, CF$_3$, or CF$_2$CF$_3$,CF$_2$H, CF$_2$CF$_2$H, CFHCF$_3$, CFHCF$_2$H and R$_9$ is F, CF$_3$, or CF$_2$CF$_3$.

In one aspect, the fluorinated non-dioxolane ring monomer has the structure below, where R$^1$ and R$^2$ are CF$_3$. In another aspect, R$^1$ is F and R$^2$ is CF$_3$.

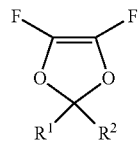

In another aspect, the fluorinated non-dioxolane ring monomer is

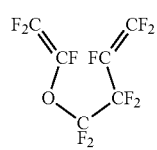

In one aspect, the fluorinated dioxolane ring monomer can be a single compound in Scheme 1, or two or more different compounds in Scheme 1. In another aspect, the fluorinated non-dioxolane ring monomer can be a single compound in Scheme 2, or two or more different compounds in Scheme 2.

In another aspect, disclosed herein is an amorphous copolymer produced by polymerizing (a) one or more fluorinated dioxolane ring monomers in the amount of from about 1 mol % to about 99.5 mol %, and (b) a comonomer comprising a fluorinated non-dioxolane ring monomer in the amount of from about 0.5 mol % to about 99 mol %. In one aspect, the amount of fluorinated dioxolane ring monomer used to produce the copolymers described herein is 1, 5, 10, 15, 20, 25, 30, 35, 40, 45, 50, 55, 80, 65, 70, 75, 80, 85, 90, 95, or about 99.5 mol %, or a combination of any of the foregoing values, or a range encompassing any of the foregoing values. In one aspect, the amount of fluorinated dioxolane ring monomer used to produce the copolymers described herein is from about 20 mol % to about 80 mol %.

Crosslinkers

The crosslinkers provided herein are compounds that possess functional groups that permit crosslinking between two or more different copolymers. In one aspect, the crosslinker is an olefinic compound that when copolymerized with a fluorinated dioxolane or non-dioxolane ring monomer produces an amorphous fluorinated copolymer. In one aspect, the amorphous fluorinated copolymer has a plurality of crosslinkable groups that are pendant to the copolymer backbone. In one aspect, the crosslinker comprises a perfluorinated olefinic compound comprising at least one crosslinkable group.

The nature of the crosslinkable group can vary depending upon the crosslinking conditions. In one aspect, the crosslinkable group comprises a photoactive group or a thermally active group. In one aspect, the crosslinkable group comprises an alkyl ester group, a cyano group, or a fluorinated vinyl ether group.

In one aspect, the crosslinker comprises one or more compounds, having the structure I:

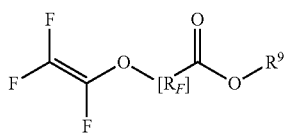

I wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

In one aspect, $R^9$ in structure I is methyl or ethyl. In another aspect, $R^F$ in structure I is $(CF_2)_r$, where r is 1, 2, 3, or 4. in another aspect, $R^F$ in structure I is $(CF_2)_s$—O—$(CF_2)_t$, where s and t are 1, 2, 3, or 4.

In one aspect, the crosslinker comprises one or more compounds having the structure II:

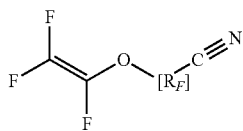

II wherein $R_F$ is a perfluoroalkyl group having from 1 to 6 carbon atoms with optionally 1 or 2 ether oxygen atoms.

In one aspect, $R^F$ in structure II is $(CF_2)_r$, where r is 1, 2, 3, or 4. In another aspect, $R^F$ in structure II is $(CF_2)_s$—$(CF_2)_t$, where s and t are 1, 2, 3, or 4.

In another aspect, the crosslinker comprises one or more compounds having the structure III:

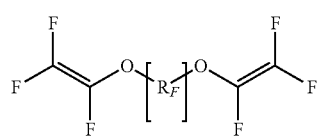

III wherein $R_F$ is a perfluoroalkyl group having from 1 to 6 carbon atoms with optionally 1 or 2 ether oxygen atoms.

In one aspect, $R^F$ in structure III is $(CF_2)_r$, where r is 1, 2, 3, or 4. In another aspect $R^F$ in structure III is $(CF_2)_s$—O—$(CF_2)_t$, where s and t are 1, 2, 3, or 4.

In one aspect, the crosslinker is:

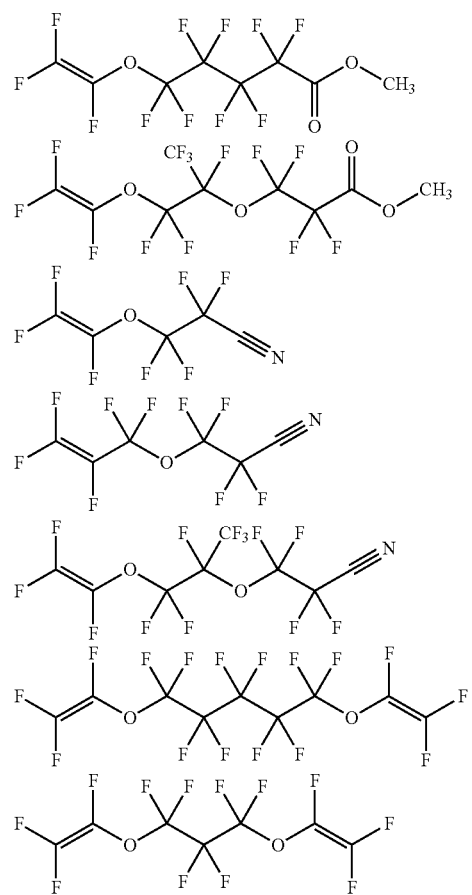

or any combination thereof.

The crosslinker can include one or more different compounds. In one aspect, the amount of crosslinker used to produce the amorphous fluorinated copolymers described herein is 0.2%, 0.5%, 1, 2, 3, 4, 5, 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 1 mol % to about 10 mol %, or about 1 mol % to about 5 mol %

Polymerization Method

In one aspect, the amorphous fluorinated copolymers described herein can be made by solution or aqueous emulsion polymerization. In another aspect, if the solution method is used, suitable solvents can be poly- or perfluorinated compounds such as perfluorooctane, hexafluoroisopropanol (HFIP), 1,1,1,3,3,3-hexafluoro-2-methoxypropane (HFMOP), Vertrel® XF ($CF_3CFHCFHCF_2CF_3$), or Fluorinert® FC-43(perfluorotri-n-butyl amine). In an alternative aspect, if the aqueous emulsion method is used, a suitable surfactant will be used. In one aspect, the disclosed polymers can optionally be polymerized in the absence of any solvent. In a further aspect, initiators can be chosen from those typically used for fluoropolymers such as hydrocarbon peroxides, fluorocarbon peroxides, hydrocarbon peroxydicarbonates, and inorganic types such as persulfates.

In one aspect, depending on the relative reactivity of the monomers to be used in the polymerization, they can either be added as a single precharge, or they may need to be co-fed as a ratioed mixture to produce the desired copolymer composition.

In another aspect, when the polymerization is determined to be complete, the polymer can be isolated using methods known in the art. In one aspect, for the solution method, the solvent (and any unreacted monomer(s)) can be removed by distillation at atmospheric or lower pressure. In some aspects, due to the typically high viscosity and amorphous nature of the polymers of this disclosure, further rigorous drying is often required to get rid of residual solvent. In a further aspect, this can involve heating to between 200 to 300° C. at atmospheric or lower pressure for between 2 to 48 hours. In another aspect, tor the aqueous emulsion method, the emulsion can be broken by several methods including freeze/thaw, addition of a strong mineral acid such as nitric acid, high shear mixing, or a combination of these methods.

The Examples provide non-limiting procedures for producing the copolymers described herein.

Structural Features of Amorphous Fluorinated Copolymers

The amorphous fluorinated copolymers described herein include the first copolymer comprises a plurality of fluorinated dioxolane ring units in the amount of 1 mol % to 99.5 mol %, and wherein, and a plurality of non-dioxolane ring units, and optionally a plurality of crosslinker units. In one aspect, The fluorinated dioxolane ring units can be present in an amount of about 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In one aspect, the fluorinated dioxolane ring unit is present in the amount of from about 20 mol % to about 80 mol %. In another aspect, the crosslinker unit can optionally be present in an amount of about 1, 2, 3, 4, 5. 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 1 mol % to about 10 mol %, or about 1 mol % to about 5 mol %.

In some aspects, the fluorinated dioxolane ring unit can be perfluorinated. In another aspect, the fluorinated dioxolane ring unit can include one or more of the following structures:

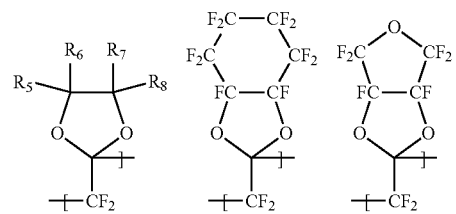

wherein:

$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring In some aspects, the fluorinated non-dioxolane ring unit can be perfluorinated. In another aspect, the fluorinated non-dioxolane ring unit can include a five- or six-membered ring, in one aspect, the fluorinated non-dioxolane ring unit can include one or more of the following structures:

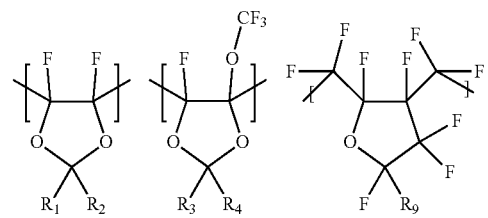

wherein:

$R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$; and $R_9$ is F, $CF_3$, or $CF_2CF_3$ In one aspect, the amorphous fluorinated copolymer has a plurality of crosslinker units with crosslinkable groups that are pendant to the copolymer backbone. In one aspect, the crosslinker comprises a perfluorinated olefinic compound comprising at least one crosslinkable group. In one aspect, the crosslinker unit has the structure IV, V, or VI, where $R^F$ and $R^9$ are as defined above with respect to structures I, II, and III:

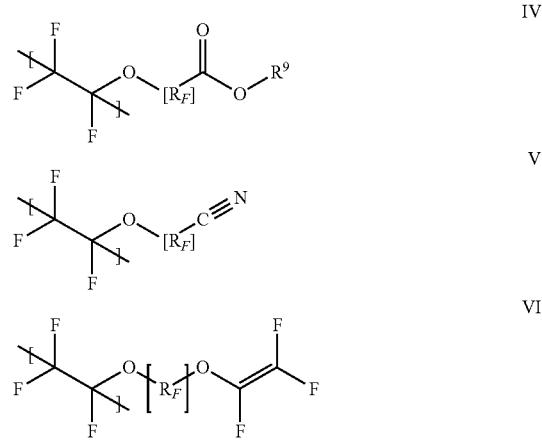

Copolymer Properties and Composition of the Amorphous Fluorinated Copolymers

In one aspect, the composition of the amorphous fluorinated copolymers used herein can usually be determined by $^{19}F$ NMR spectroscopy. Further in this aspect, the polymers are (unless crosslinked) readily soluble in perfluorobenzene and an insert probe of deuterobenzene ($C_6D_6$) can be used to give a lock signal. In a further aspect, differential scanning calorimetry (DSC) can be used to determine the glass transition temperature ($T_g$), and the molecular weight distribution can be found by using gel permeation chromatography (GPC) with a styrene-divinyl benzene column in a perfluorinated solvent coupled with a multi-detector analysis module including refractive index, low-angle light scattering, and right-angle light scattering detectors or using other suitable equipment and/or methods as known in the art. If desired, in one aspect, the type and concentration of end groups can also be determined by pressing a film of the polymer and acquiring an infrared (IR) spectrum in transmission mode.

In one aspect, the amorphous fluorinated copolymer can have a glass transition temperature of from about 110° C. to about 300° C., or about 110° C., 125° C., 150° C., 175° C., 200° C., 225° C., 250° C., 275° C., or 300° C., or a combination of any of the foregoing values, or a range encompassing any of the foregoing values.

In still another aspect, the amorphous fluorinated copolymer can have a number average molecular weight ($M_n$) of from about 10 kDa to about 2,000 kDa, or 10 kDa, 50 kDa, 100 kDa, 150 kDa, 200 kDa, 250 kDa. 300 kDa, 350 kDa, 400 kDa, 450 kDa, 500 kDa, 550 kDa, 600 kDa, 650 kDa, 700 kDa, 750 kDa, 800 kDa, 850 kDa, 900 kDa, 950 kDa, 1,000 kDa, 1,050 kDa, 1,100 kDa, 1,150 kDa, 1,200 kDa, 1,250 kDa, 1,300 kDa, 1,350 kDa, 1,400 kDa, 1,450 kDa, 1,500 kDa, 1550 kDa, 1,600 kDa, 1,650 kDa, 1,700 kDa, 1,750 kDa, 1,800 kDa, 1,850 KDa, 1,900 kDa, 1,950 kDa, or 2,000 kDa, or a combination of any of the foregoing values, or a range encompassing any of the foregoing values.

In still another aspect, the amorphous fluorinated copolymer can have a weight average molecular weight ($M_w$) of from about 10,000 g/mol to about 3,000,000 g/mol, or 10,000 g/mol, 50,000 g/mol, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, 1,500,000 g/mol 1,600,000 g/mol, 1,700,000 g/mol, 1,800,000 g/mol, 1,900,000 g/mol, 2,000,000 g/mol, 2,100,000 g/mol, 2,200,000 g/mol, 2,300,000 g/mol, 2,400,000 g/mol, 2,500,000 g/mol, 2,600,000 g/mol, 2,700,000 g/mol, 2,800,000 g/mol, 2,900,000 g/mol, or 3,000,000 g/mol, or a combination of any of the foregoing values, or a range encompassing any of the foregoing values.

Preparation of Amorphous Crosslinked Fluorinated Copolymers

If crosslinking units are included, the amorphous fluorinated copolymers described herein may be crosslinked to produce amorphous crosslinked fluorinated copolymers. In one aspect, the amorphous fluorinated copolymer can be formed into a shaped component, and then the component is exposed to crosslinking conditions to produce the crosslinked copolymer. The component may be formed by using any of a number of techniques including, but not limited to, casting, extruding, molding, shaping. In another aspect, the component may be in the form of a sheet, film, membrane, or other useful forms.

Suitable crosslinking technique or conditions thereof may be determined, at least in part, based upon the selected crosslinking monomer and the desired results. In one aspect, the amorphous fluorinated copolymer is heated for a sufficient time and temperature to crosslink the copolymer. In one aspect, the amorphous fluorinated copolymer is crosslinked by heating the copolymer at a temperature greater than 300° C. In another aspect, the amorphous fluorinated copolymer is crosslinked by heating the copolymer at a temperature of from about 300° C. to about 350° C., or about 300° C., 305° C., 310° C., 315° C., 320° C., 325° C., 330° C., 335° C., 340° C., 345° C., or 350° C., where any value can be a lower and upper endpoint of a range (e.g., 310° C. to 330° C.). In another aspect, the amorphous fluorinated copolymer is heated from 0.5 minutes to 60 minutes, or 0.5 minutes, 5 minutes, 10 minutes, 15 minutes, 20 minutes, 25 minutes, 30 minutes, 35 minutes, 40 minutes, 45 minutes, 50 minutes, 55 minutes, or 60 minutes, where any value can be a lower and upper endpoint of a range (e.g., 10 minutes to 30 minutes).

In another aspect, the amorphous fluorinated copolymer is crosslinked by exposing the copolymer to UV radiation. In one aspect, the amorphous fluorinated copolymer is exposed to UV radiation at a wavelength of less than 300 nm to crosslink the amorphous fluorinated copolymer. In another aspect, the amorphous fluorinated copolymer is exposed to UV radiation at a wavelength of about 250 nm to about 300 nm, or about 250 nm, 255 nm, 260 nm, 265 nm, 270 nm, 275 nm, 280 nm, 285 nm, 290 nm, or 300 nm, where any value can be a lower and upper endpoint of a range (e.g., 260 nm to 290 nm). In another aspect, the amorphous fluorinated copolymer is exposed to UV radiation from 0.5 hours to 48 hours, or 0.5 hours, 1 hour, 3 hours, 6 hours, 12 hours, 18 hours, 24 hours, 30 hours, 36 hours, or 48 hours, where any value can be a lower and upper endpoint of a range (e.g., 3 hours to 24 hours).

In certain aspects, the amorphous crosslinked fluorinated copolymer material has different thermal, mechanical, and/or solubility properties than the uncrosslinked copolymer. In some aspects, the crosslinked copolymer has improved cracking resistance as compared to similar uncrosslinked copolymers. In some aspects, the crosslinked copolymer material has a notched tensile strength that is greater than the notched tensile strength of the un-crosslinked amorphous copolymer. In an aspect, the crosslinked polymeric material has a notched tensile strength that is at least a factor of two greater than the notched tensile strength of the un-crosslinked amorphous copolymer.

Separation Articles and Applications Thereof

Disclosed herein are separation articles including or made from the amorphous fluorinated copolymers described herein, in one aspect, the article can be a multi-layered structured article, wherein at least one layer of the structure includes or is made from the copolymers described herein. In another aspect, the article can be a film, a membrane, a tube, or a fiber.

In one aspect, the separation article can include a layer or coating of the amorphous crosslinked fluorinated copolymer. This feature is referred to herein as a "selective layer." In one aspect, the selective layer has a thickness of less than or equal to 1 μm, or less than or equal to about 950, 900, 850, 800, 750, 700, 650, 600, 550, or about 500 nm, or a combination of any of the foregoing values, or a range encompassing any of the foregoing values. in another aspect, the layer or coating has a thickness of about 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1 μm, or a combination of any of the foregoing values, or a range encompassing any of the foregoing values.

In one aspect, the selective layer has a thickness of about 10 µm, 50 µm, 100 µm, 150 µm, 200 µm, 250 µm, 300 µm, 350 nm, 400 µm, 450 µm, 500 µm, 550 µm, 600 µm, 650 µm, 700 µm, 750 µm, 800 µm, 850 µm, 900 µm, 950 µm, or 1,000 µm, or a combination of any of the foregoing values, or a range encompassing any of the foregoing values.

In a further aspect, the amorphous crosslinked fluorinated copolymer may be formed or shaped into any shape that is necessary or desirable for use as a separation article. There are numerous methods known to shape the copolymer into single-layer or multi-layer films or membranes. In some aspects, the separation article can comprise an unsupported film, tube, or fiber of the amorphous crosslinked fluorinated copolymer as a single-layer membrane. In some aspects, an unsupported film may be too thick to permit desirable gas flow through the membrane. Therefore, in some aspects, the separation article may comprise a very thin layer composed of the amorphous crosslinked fluorinated copolymer placed on top of (i.e., adjacent to or in contact with) a much more permeable supporting structure. For example, in one aspect, when the separation article is a membrane, the membrane may comprise an integral asymmetric membrane, in which a more dense layer of copolymer is placed on top of a microporous support layer. Such membranes were originally developed by Loeb and Sourirajan, and their preparation in flat sheet or hollow fiber form is described, for example, in U.S. Pat. No. 3,133,132 to Loeb, and U.S. Pat. No. 4,230,463 to Henis and Tripodi, the disclosures of which are incorporated herein by reference.

In some aspects, the separation article may comprise multiple layers, including at least one layer of copolymer described herein, with each layer serving a distinct purpose. Further in this aspect, in such multilayer composite membranes, there may be a microporous support layer, which provides mechanical strength. In another aspect, the multi-layer membrane may include a non-porous, but highly permeable "gutter" layer, for example, coated on the microporous support layer. Further in this aspect, this gutter layer is generally not selective, but may instead form a smooth surface on which to deposit the extremely thin layer of copolymer described herein, which performs the primary selective function of the membrane. In another aspect, the gutter layer also may channel permeate gas to the pores of the support layer. In an additional aspect, the layer of copolymer described herein may be covered by a protective layer. In one aspect, the primary purpose of the protective layer is to prevent fouling of the layer of copolymer described herein, such as by certain components of the gas stream, in some aspects, the disclosed multilayer structures may be, but not necessarily, formed by solution casting. General preparation techniques for making composite membranes of this type are described, for example, in U.S. Pat. No. 4,243,701 to Riley et al, the disclosures of which are incorporated herein by reference. In one aspect, disclosed herein is a gas separation membrane including a feed side and a permeate side, wherein the separation membrane has a layer that includes or is constructed from a copolymer described herein.

In one aspect, the multilayer composite membrane may take flat-sheet, tube, or hollow-fiber form. In hollow-fiber form, in one aspect, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417, the disclosures of which are incorporated herein by reference.

In another aspect, the thickness of a membrane composed of a copolymer described herein may be determined based on one or more parameters of the separation process. In some aspects, the thickness of the membrane is less than about 1 µm. In a preferred embodiment, the layer of copolymer described herein can be even thinner, for example, the layer can be as thin as 0.5 µm or less. The layer of copolymer described herein, in one aspect, should have a thickness that is sufficiently thin so that the membrane provide a pressure-normalized hydrogen flux, as measured with pure hydrogen gas at 25° C., of at least 100 GPU (where 1 GPU=1×10$^{-6}$ cm$^3$ (STP)/cm$^2$s cmHg), and preferably at least 400 CPU.

In one aspect, the separation articles described herein are mechanically robust and also exhibit high thermal stability, and high chemical resistance. In another aspect, the copolymers described herein that form the selective layer are typically soluble only in perfluorinated solvents, and if crosslinked, are typically insoluble even in perfluorinated solvents. In still another aspect, they are also typically stable over many years when immersed in acids, alkalis, oils, low-molecular-weight esters, ethers and ketones, aliphatic and aromatic hydrocarbons, and oxidizing agents. In yet another aspect, they are also thermally stable over many years at temperatures below the glass transition temperature. Thus, in any of these aspects, they are suitable for use in natural gas streams and many other demanding environments.

In one aspect, the separation article may be used in any suitable apparatus. For example, membranes are typically used in the form of a module, comprising the membrane prepared in any known form, and housed in any convenient type of housing and separation unit. Any number of membrane modules may be used in conjunction (e.g., in serial, in parallel) to treat a gas stream. The number of membrane modules may be determined based on one or more factors including, for example, the necessary or desired flow volume, stream composition, and other operating parameters of the separation process. In the separation process, in one aspect, the membrane is exposed to a flowing gaseous feed-composition comprising the gas mixture. In another aspect, this gas flow is created by a pressure differential that is established across the membrane, either through pressurization of the feed/retentate side of the membrane, or application of vacuum to the permeate side of the membrane. Separation of the components of the gas stream occurs, in one aspect, through the membrane, producing a gas stream on the permeate-side of the membrane with a composition enriched in the more permeable component of the gas mixture. Conversely, in another aspect, the gas stream exiting the module on the feed/retentate side of the membrane has a composition that is depleted in the more permeable component of the gas mixture, and thus enriched in the less permeable component (or components) of the gas mixture.

In one aspect, the disclosure relates to an apparatus and a process for separating at least one component from a gas mixture. In another aspect, the disclosed apparatus includes a separation article as described herein (e.g., membrane) that includes a copolymer described herein that is configured to be selectively permeable for the desired component to be separated from the gas mixture. Optionally, in an aspect, the membrane may contain one or more other layers which serve various purposes, such as a porous support layer, a "gutter layer" which allows the permeate gas to pass from the layer of copolymer described herein to the porous layer with minimal flow impedance, and a protective layer, which protects the layer of copolymer from fouling.

The separation articles described herein are useful in the field of gas separation. In one aspect, disclosed herein is a method for separating a first gaseous component from a gaseous mixture, the process comprising passing the gaseous mixture across a separation article described herein. In one aspect, the separation article is a membrane having one or more layers composed of an amorphous fluorinated copolymer described herein. In some aspects, the amorphous fluorinated copolymer can be cast from solution onto a membrane to produce a selective layer composed of copolymer described herein. In one aspect, amorphous fluorinated copolymer is soluble in one or more solvents. Conversely, crystalline fluoropolymers, which typically have negligible solubility in solvents, are not be preferred. In another aspect, crystalline polymers typically exhibit low gas permeabilities as compared to amorphous polymers.

The separation articles composed of the amorphous fluorinated copolymers described herein are selectively permeable for a targeted (i.e., desired) component to be separated from the gas mixture. In some aspects, a process for separating a first component (i.e., targeted or desired component) from a gaseous mixture includes introducing a feed stream comprising the gaseous mixture to the separation article described herein. In one aspect, the separation article is a membrane having a first side, a second side, and composed of a copolymer described herein that is selectively permeable for the first component, i.e., the first component has a higher permeability through the selective layer than other components of the gaseous mixture.

In one aspect, the feed stream is introduced to the first side of the membrane. Further in this aspect, a driving force (e.g., pressure differential) causes at least a portion of the gaseous mixture to permeate through the membrane from the first side to the second side, providing a permeate stream on the second side of the membrane. In a further aspect, the resulting permeate stream is enriched in the first component. In another aspect, a residue or retentate stream depleted in the first component may be withdrawn from the first side of the membrane.

An example of this is depicted in FIG. 1. Referring to FIG. 1, a mixture of $CO_2$ and $CH_4$ is passed through the selective layer composed of a copolymer described herein. The selective layer is selectively permeable to $CO_2$ (i.e., the targeted gaseous component or permeate) compared to $CH_4$. Thus, in this example, $CO_2$ is selectively removed from a mixture of $CO_2$ and $CR_4$, where $CH_4$ is the retentate as depicted in FIG. 1.

In one aspect, in the gas separation method disclosed herein, the method includes at least the following steps:
(a) passing the gaseous mixture across a separation article having a feed side and a permeate side, wherein the separation article is selectively permeable to at least the first gaseous component; and
(b) providing a driving force sufficient for transmembrane permeation of at least a portion of the gaseous mixture from the feed side to the permeate side of the separation membrane, resulting in a gaseous permeate stream on the permeate side of the separation membrane and a gaseous retentate stream on the feed side of the separation membrane, wherein the gaseous permeate stream includes the first gaseous component.

In another aspect, the permeate stream has a concentration of first component that is greater than a concentration of the first component in the retentate stream.

In still another aspect, the method further includes the step of withdrawing the permeate stream from the permeate side of the separation article. In a further aspect, the method also includes the step of withdrawing the retentate stream from the feed side of the separation membrane.

In one aspect, the first gaseous component is carbon dioxide, hydrogen sulfide, helium, or any combination thereof. In one aspect, the gaseous mixture includes methane and carbon dioxide.

In another aspect, the gaseous mixture includes one or more fluorinated refrigerant gases. In another aspect, the gas mixture includes an azeotropic or near-azeotropic mixture of gases. In another aspect, the gas mixture includes an azeotropic or near-azeotropic mixture of gases, of which one or more of the components is a fluorinated refrigerant.

In another aspect, more than about 50, 55, 60, 65, 70, 76, 80, 86, 90, or more than about 95% of the first gaseous component in the gaseous mixture permeates through the separation membrane, or a combination of any of the foregoing values, or a range encompassing any of the foregoing values.

In one aspect, the separation articles described herein will be useful in a number of applications, particularly those related to separation of $CO_2$ from other gases.

In one aspect, the separation articles described herein are useful for separating acid gases, including carbon dioxide and hydrogen sulfide, from a natural gas stream, which might be found either at a well or a processing plant. In another aspect, since such natural gas streams often contain higher molecular weight hydrocarbon vapors that can foul or plasticize hydrocarbon membranes, the perfluorinated nature of the copolymers described herein is particularly suitable for such applications, as it is highly resistant to such degradation.

In addition to undesirable acid gases, in one aspect, natural gas streams sometimes contain helium, which is desirable as a separate product. In a further aspect, the process of the present disclosure is useful for separating helium from natural as streams, so that the resulting helium-rich gas can be further refined into purified helium.

In one aspect, the process of the present disclosure is useful for separating mixtures of fluorinated refrigerant gases, including azeotropic or near azeotropic mixtures of such gases.

Aspects

The present disclosure can be described in accordance with the following numbered aspects, which should not be confused with the claims.

Aspect 1. A separation article comprising an amorphous fluorinated copolymer comprising both a fluorinated dioxolane ring unit and a fluorinated non-dioxolane ring unit, optionally with crosslinking between the polymer chains, wherein the amorphous fluorinated copolymer is selectively permeable to a targeted gaseous component present in a gaseous mixture comprising the targeted gaseous component and one or more other gaseous components.

Aspect 2. The separation article of Aspect 1 wherein the amorphous fluorinated copolymer is produced by (a) copolymerizing one or more fluorinated dioxolane ring monomers in the amount of 1 mol % to 99.5 mol %, and one or more fluorinated non-dioxolane ring monomers in the amount of 1 mol % to 99.5 mol %, and, optionally, a crosslinker in the amount of from 0.2 mol % to 20 mol % to produce a first copolymer and (b) optionally, crosslinking the first copolymer to produce the amorphous crosslinked fluoropolymer.

Aspect 3. The separation article of Aspect 2, wherein the fluorinated dioxolane ring monomer is perfluorinated.

Aspect 4. The separation article of Aspect 2, wherein the fluorinated dioxolane ring monomer and the fluorinated non-dioxolane ring monomer are both perfluorinated.

Aspect 5. The separation article of Aspect 2, wherein the fluorinated non-dioxolane ring monomer is an olefinic compound.

Aspect 6. The separation article of Aspect 2, wherein the fluorinated non-dioxolane ring monomer comprises a five or six membered ring.

Aspect 7. The separation article of Aspect 2, wherein the fluorinated dioxolane ring monomer comprises one or more of the following compounds:

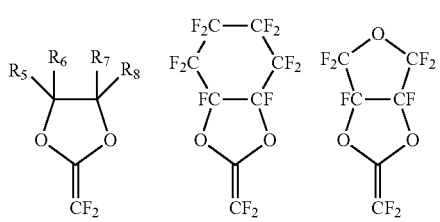

wherein
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring Aspect 8. The separation article of Aspect 2, wherein the fluorinated non-dioxolane ring monomer comprises one or more of the following compounds:

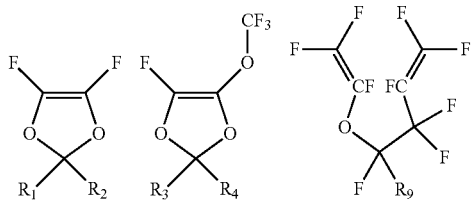

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$
And $R_9$ is F, $CF_3$, or $CF_2CF_3$.

Aspect 9. The separation article of Aspect 2, wherein the fluorinated dioxolane ring monomer is a single compound.

Aspect 10. The separation article of Aspect 2, wherein the fluorinated dioxolane ring monomer is two or more different compounds.

Aspect 11. The separation article of Aspect 2, wherein the fluorinated non-dioxolane ring monomer is a single compound.

Aspect 12. The separation article of any one of Aspects 2-11, wherein the fluorinated non-dioxolane ring monomer is two or more different compounds.

Aspect 13. The separation article of any one of Aspects 2-12, wherein the fluorinated dioxolane ring monomer is in the amount of 20 mol % to 80 mol %.

Aspect 14. The separation article of any one of Aspects 2-13, wherein the crosslinker comprises a perfluorinated olefinic compound comprising at least one crosslinkable group.

Aspect 15. The separation article of Aspect 14, wherein the crosslinkable group comprises a photoactive group or a thermally active group.

Aspect 16. The separation article of Aspect 14, wherein the crosslinkable group comprises an alkyl ester group, a cyano group, or a fluorinated vinyl ether group, Aspect 17. The separation article of any one of Aspects 2-13, wherein the crosslinker comprises one or more compounds having the structure I:

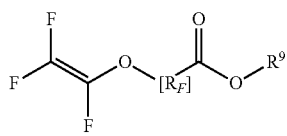

wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

Aspect 18. The separation article of any one of Aspects 2-13, wherein the crosslinker comprises one or more compounds having the structure II:

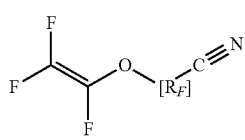

wherein $R_F$ is a perfluoroalkyl group having from 1 to 6 carbon atoms with optionally 1 or 2 ether oxygen atoms.

Aspect 19. The separation article of any one of Aspects 2-13, wherein the crosslinker comprises one or more compounds having the structure III:

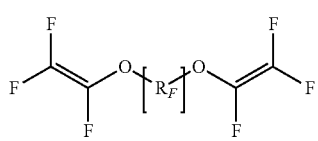

wherein $R_F$ is a perfluoroalkyl group having from 1 to 6 carbon atoms with optionally 1 or 2 ether oxygen atoms.

Aspect 20. The separation article of any one of Aspects 2-13, wherein the crosslinker is a single compound.

Aspect 21. The separation article of any one of Aspects 2-13, wherein the crosslinkers two or more different compounds.

Aspect 22. The separation article of any one of Aspects 2-13, wherein the crosslinker is:

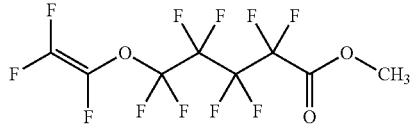

-continued

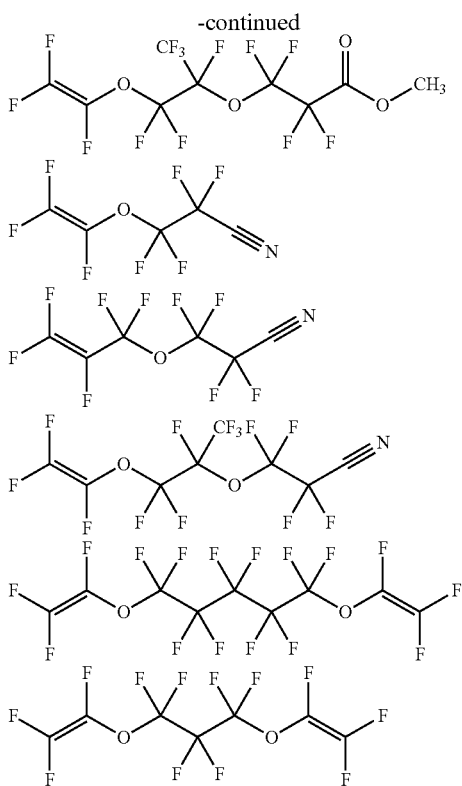

or any combination thereof.

Aspect 23. The separation article of any one of Aspects 2-22, wherein the crosslinker is in the amount of 0.2 mol % to 20 mol %.

Aspect 24. The separation article of Aspect 2, wherein the fluorinated dioxolane ring monomer comprises one or more of the following compounds:

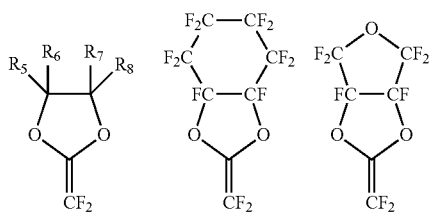

and wherein the fluorinated non-dioxolane ring monomer comprises one or more of the following compounds:

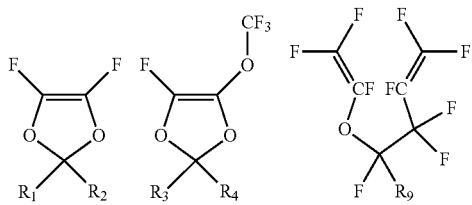

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$; and
the crosslinker comprises one or more compounds having the following structure:

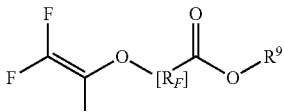

I

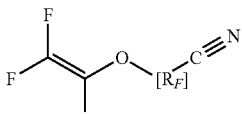

II

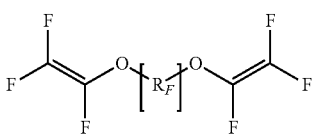

III wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

Aspect 25. The separation article of Aspect 2, wherein the fluorinated dioxolane ring monomer has the structure

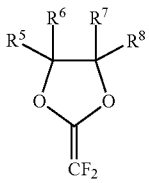

wherein $R^5$, $R^6$, and $R^7$ are F and $R^8$ is $CF_3$, and the fluorinated non-dioxolane ring monomer is

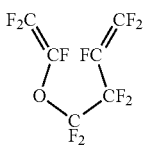

Aspect 26. The separation article of Aspect 2, wherein the fluorinated dioxolane ring monomer has the structure

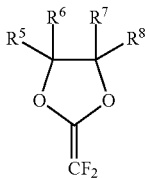

wherein $R^5$, $R^6$, and $R^7$ are F and $R^8$ is $CF_3$, and the fluorinated non-dioxolane ring monomer is

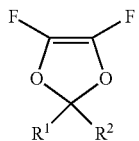

wherein $R^1$ and $R^2$ are $CF_3$ or $R^1$ is F and $R^2$ is $CF_3$.

Aspect 27 The separation article of any one of Aspects 2-26, wherein the first copolymer is produced by solution or aqueous emulsion polymerization.

Aspect 28. The separation article of any one of Aspects 2-26, wherein the copolymerization is conducted in the presence of an initiator.

Aspect 29, The separation article of Aspect 26, wherein the initiator comprises a hydrocarbon peroxide, a fluorocarbon peroxide, a hydrocarbon peroxydicarbonate, an inorganic fluorocarbon initiator, or any combination thereof.

Aspect 30. The separation article of any one of Aspects 2-29, wherein the first copolymer is crosslinked by exposing the first copolymer to UV radiation at a wavelength of less than 300 nm.

Aspect 31 The separation article of any one of Aspects 2-29, wherein the first copolymer is crosslinked by exposing the first copolymer to UV radiation at a wavelength of less than 300 nm from about 0.5 hours to about 48 hours.

Aspect 32. The separation article of any one of Aspects 2-29, wherein the first copolymer is crosslinked by exposing the first copolymer to UV radiation at a wavelength of, about 250 nm to about 300 nm from about 0.5 hours to about 48 hours.

Aspect 33. The separation article of any one of Aspects 2-29, wherein the first copolymer is crosslinked by heating the first copolymer at a temperature of from about 300° C. to about 350° C. for 0.5 minutes to 60 minutes.

Aspect 34. The separation article of Aspect 1, wherein the amorphous fluorinated copolymer is PBVE-co-D1.

Aspect 35. The separation article in any one of Aspects 1-34, wherein the first copolymer has a glass transition temperature of from 110° C. to 300° C.

Aspect 36. The separation article in any one of Aspects 1-34, wherein the first copolymer has a $M_n$ of from 10 kDa to 2,000 kDa.

Aspect 37. The separation article in any one of Aspects 1-34, wherein the first copolymer has a of from 10,000 g/mol to 3,000,000 g/mol.

Aspect 38. The separation article in any one of Aspects 1-34, wherein the separation article comprises a multi-layer structured article, wherein at least one layer of the structure comprises the amorphous fluorinated copolymer.

Aspect 39. The separation article in any one of Aspects 1-34, wherein the separation article comprises a film, membrane, tube, or fiber.

Aspect 40. The separation article in any one of Aspects 1-34, wherein the separation article comprises a layer of the amorphous fluorinated copolymer, wherein the layer has a thickness of less than or equal to 1 μm.

Aspect 41. A method for separating a first gaseous component from a gaseous mixture said process comprising passing the gaseous mixture across a separation article in any one of Aspects 1-40.

Aspect 42. The method of Aspect 41, wherein the method comprises (a) passing the gaseous mixture across a separation article having a feed side and a permeate side, wherein the separation article is selectively permeable to at least the first gaseous component;

(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

Aspect 43. The method of Aspect 42, wherein the permeate stream has a concentration of first component that is greater than a concentration of the first component in the retentate stream.

Aspect 44. The method of Aspects 42 or 43, further comprising withdrawing the permeate stream from the permeate side of the separation article.

Aspect 45. The method of any one of Aspects 42-44, further comprising withdrawing the retentate stream from the feed side of the separation article.

Aspect 46. The method of any one of Aspects 42-45, wherein the first gaseous component is carbon dioxide, hydrogen sulfide, helium, or any combination thereof.

Aspect 47. The method of any one of Aspects 42-45, wherein the gaseous mixture comprises methane and carbon dioxide.

Aspect 48. The method of any one of Aspects 42-47, wherein more than about 50% or more of the first gaseous component in the gaseous mixture permeates through the separation article.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Synthesis of PBVE-co-D1 Polymer

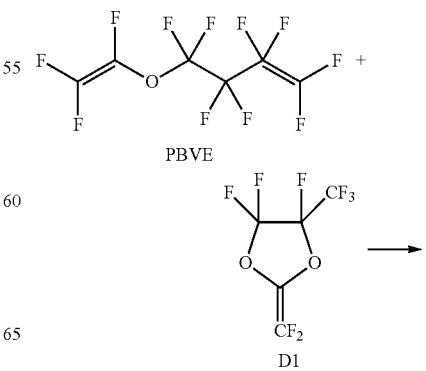

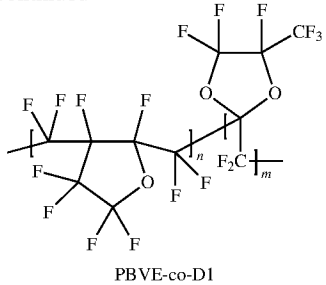

PBVE-co-D1

FC-770 (perfluoro-N-isopropylmorpholine) solvent was purified by fractional distillation and the fractions that distilled between 91-93° C. were used as the solvent for this polymerization. The purified FC-770 (100 mL, 180 g) was added to a 250 mL Duran glass jar along with a magnetic stirbar. The lid was attached and valves to an argon source and vacuum (30 Torr) were connected. The solvent was degassed by cycling four times through vacuum/argon backfill. Perfluoro(butenyl vinyl ether) (PBVE) monomer (15.0 mL, 24.0 g) was added via syringe. The solution was heated to 65° C., and the polymerization was initiated by addition of perfluorobenzoyl peroxide (0.20 g). A solution of FC-770 (30 mL, 54 g) and perfluoro(2-methylene-4-methyl-1,3-dioxole) (D1) monomer (24.0 mL, 38.4 g) was chilled to 5° C. and fed via syringe pump at a rate of 0.15 mL/min. for 3 hrs.

Figure 2:
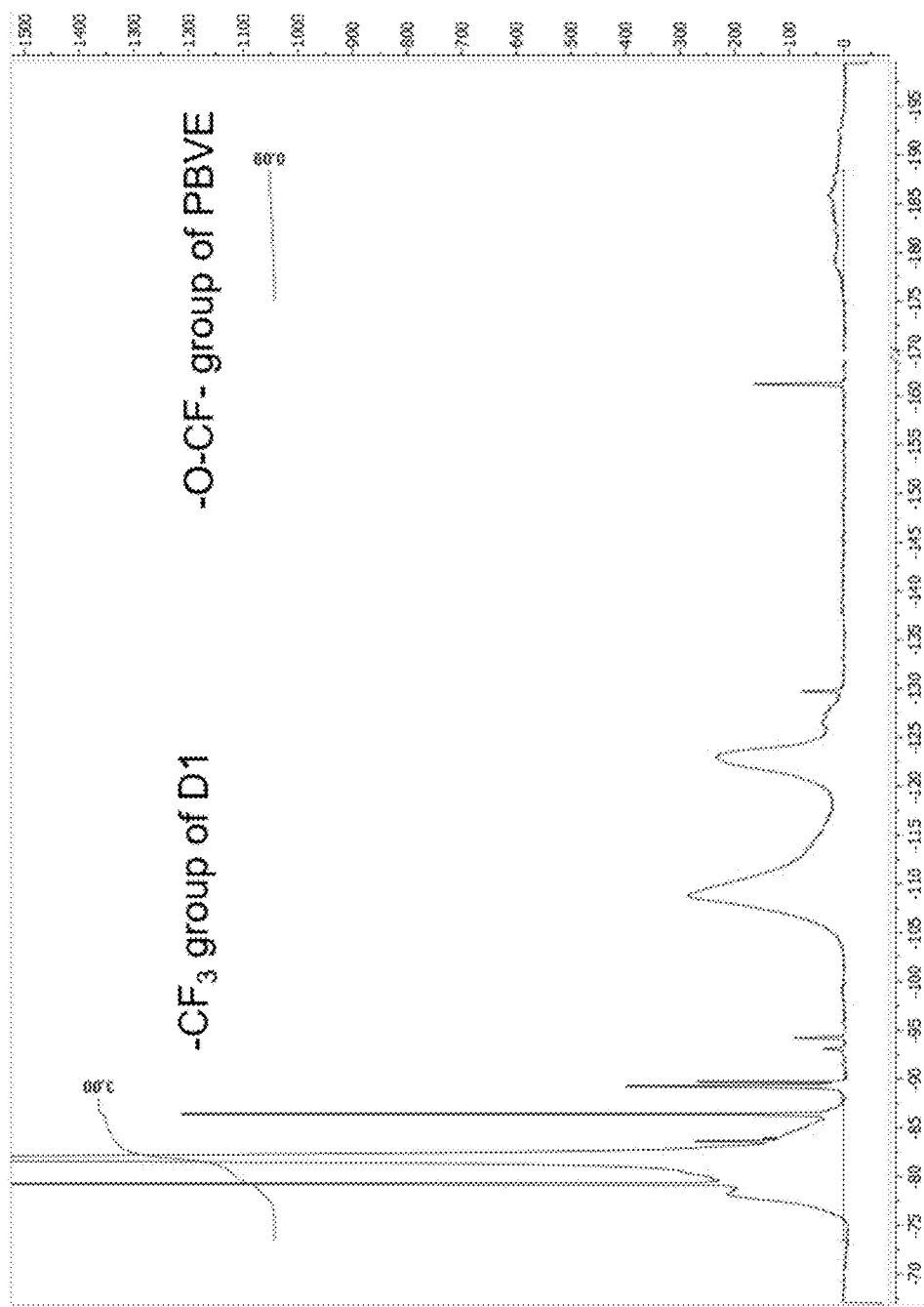
FIG. 2 shows the $^{19}F$ NMR resonance spectrum of PBVE-co-D1 polymer.

The resulting viscous solution was reduced in vacua first on a rotary evaporator and then in a vacuum oven (275° C., 200 milliTorr) for 15 hours to obtain 19.5 g of white copolymer. Composition was determined by $^{19}F$ NMR to be 88.8/11.2 mol % PFMMD/PBVE (FIG. 2). Tg measured by DSC=120.6° C.

Example 2: Synthesis of PDD-co-D1 Polymer

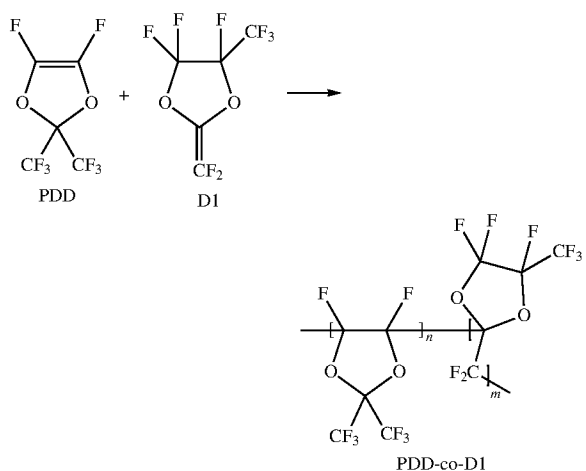

PDD-co-D1

Perfluorooctane solvent (56 mL, 100 g) was added to a 100 mL Duran glass jar along with a magnetic stirbar. The lid was attached and valves to an argon source and vacuum (30 Torr) were connected. The solvent was degassed by cycling four times through vacuum/argon backfill. Freshly distilled 4,5-difluoro-2,2-bis(trifluoromethyl)-1,3-dioxole (PDD) (20.0 mL. 34.4 g) was added via syringe, followed by the D1 comonomer (3.7 mL, 6.0 g), The polymerization was initiated by addition of hexafluoropropylene oxide dimer peroxide (HFPO-DP, $[CF_3CF_2CF_2OCF(CF_3)COO]_2$) solution (1.5 mL of 0.16 M in Vertrel XF). The solution was stirred at 22° C. for 20 hours at which time it had completely gelled. The gel was dried in a vacuum oven (275° C., 200 milliTorr) for 15 hours to obtain 37.5 g of white copolymer. Tg measured by DSC=200.0° C.

Example 3: Measurement of Gas Permeability and Selectivity of Copolymer

The copolymer synthesized in Example 1 was thoroughly dried under vacuum for 24 hours at 200° C. The dried polymer was then pressed into a 200 micron thick film using a hot press at 240° C. As small piece of the pressed film was placed into a microbalance (Hiden Isochema, Model IGA 003) and degassed overnight at a pressure of $10^{-10}$ MPa and a temperature of 35° C.

Figures 3A, 3B:
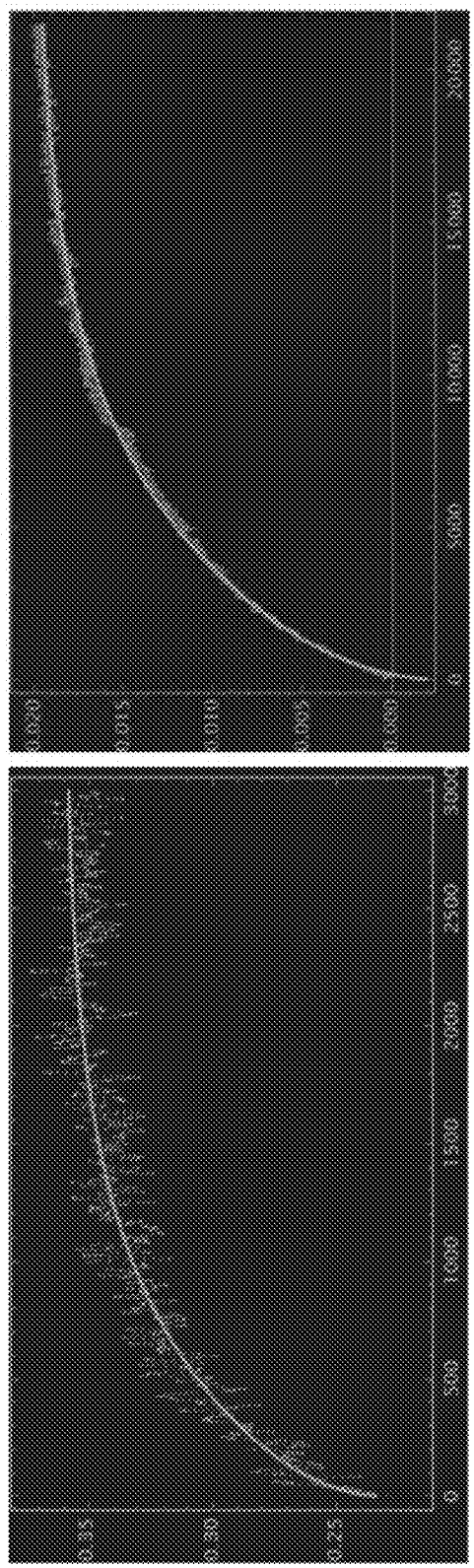
FIGS. 3A and 3B show gas uptake (units) in degassed sample vs. time (in seconds) for a sample of D1/PBVE copolymer with 11.2 mol % PBVE when the pressurizing gas is $CO_2$ (A) and $CH_4$ (B) at a pressure of 2 atmospheres.

After degassing, a flow of pure gas was introduced over the sample, with the sample chamber held at constant pressure, typically between 0.5 and 20 atmospheres. The uptake of gas in the sample film was measured by the change of sample mass, which is recorded very sensitively by the microbalance. FIGS. 3A-3B show the change in sample mass measured as a function of time when the pressurizing gas is $CO_2$ (A) and $CH_4$ (B) at a pressure of 2 atmospheres. FIGS. 3A and 3B show gas uptake (units) in degassed sample vs. time (in seconds) for a sample of D1/PBVE copolymer with 11.2 mol % PBVE when the pressurizing gas is $CO_2$ (A) and $CH^4$ (B) at a pressure of 2 atmospheres.

From these data the solubility of each pure gas in the polymer may be determined easily from the limiting values of mass uptake at long times after the gas pressure is applied. The solubility, $S_i$, of the gas species index with i may be determined as $$S_i = \frac{C}{p},$$

where C is the concentration of absorbed gas molecules in the solid, and p is the applied pressure.

The diffusivity $D_i$ of each gas species in the polymer may be determined by assuming one-dimensional Fickian diffusion of the gas species i into the polymer. In this case, the concentration of absorbed gas molecules at a depth x below the surface of the film has the time dependence $$\frac{dC}{dt} = D_i \frac{d^2C}{dx^2}$$

where t is the elapsed time since the gas pressure was applied with the boundary conditions $C = C_s$ for $t > 0$, at $x = 0$ and $x = \delta$ $\frac{dC}{dx} = 0$ for $t > 0$, at $x = \delta/2$ where δ denotes the thickness of the film and Cs is the concentration of absorbed gas.

The initial conditions are:
C=0 at t=0 for 0<x<δ
The above differential equation has the solution $$C(t) = C_S - \frac{2}{\pi^2} C_S \sum_{n=0}^{\infty} \left( \frac{(-1)^n - 1}{n^2} e^{-\frac{D_i \pi^2 n^2 t}{\delta^2}} (\cos n\pi - 1) \right)$$

Allowing the diffusion constants $D_i$ to be calculated by curve fitting to the observed mass uptake curves for each gas i.

After the solubility and diffusivity for each gas in the polymer have been determined as above, the permeability $P_i$ of the polymer to that gas may be calculated as $$P_i = S_i \cdot D_i$$

For the polymer synthesized in Example 1, the resulting, solubility, diffusivity, and permeability for CO2 and CH4 are shown in the table below:

| Gas | $S_i$ (cm³ (STP)/ cm³*atm) | $D_i$ (cm²/s) | Permeability (barrer) |
|---|---|---|---|
| $CO_2$ | 1.44 | $1.1 \times 10^{-7}$ | 21 |
| $CH_4$ | 0.228 | $1.3 \times 10^{-8}$ | 0.391 |

Consequently, the measured ideal selectivity α of this polymer for separation of CO2 and CH4 is $$\alpha = \frac{P_{CO_2}}{P_{CH_4}} \cong 50$$

indicating that this polymer is one of the most selective polymers ever recorded for separation of $CO_2$ and $CH_4$. Additionally, the absolute permeability of the polymer for $CO_2$ is comparatively high, indicating that the polymer may be practically applied to membrane separation of methane and carbon dioxide in industrially relevant volumes.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A separation article comprising an amorphous crosslinked fluorinated copolymer comprising both a fluorinated dioxolane ring unit and a fluorinated non-dioxolane ring unit, wherein the amorphous fluorinated copolymer is selectively permeable to a targeted gaseous component present in a gaseous mixture comprising the targeted gaseous component and one or more other gaseous components,
wherein the amorphous crosslinked fluorinated copolymer is produced by (a) copolymerizing a one or more fluorinated dioxolane ring monomers in an amount of 1 mol % to 99.5 mol %, and a one or more fluorinated non-dioxolane ring monomers in an amount of 1 mol % to 99.5 mol %, and a crosslinker in the amount of from 0.2 mol % to 20 mol % to produce a first copolymer and
(b) crosslinking the first copolymer to produce the amorphous fluorinated crosslinked fluoropolymer.

2. The separation article of claim 1, wherein the fluorinated dioxolane ring monomer is perfluorinated.

3. The separation article of claim 1, wherein the fluorinated dioxolane ring monomer and the fluorinated non-dioxolane ring monomer are both perfluorinated.

4. The separation article of claim 1, wherein the fluorinated non-dioxolane ring monomer is an olefinic compound.

5. The separation article of claim 1, wherein the fluorinated non-dioxolane ring monomer comprises a five or six membered ring.

6. The separation article of claim 1, wherein the fluorinated dioxolane ring monomer comprises one or more of the following compounds:

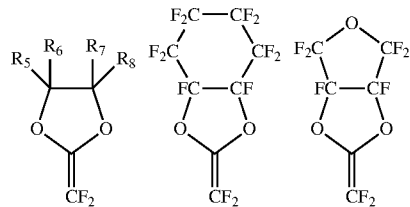

wherein
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring.

7. The separation article of claim 1, wherein the fluorinated non-dioxolane ring monomer comprises one or more of the following compounds:

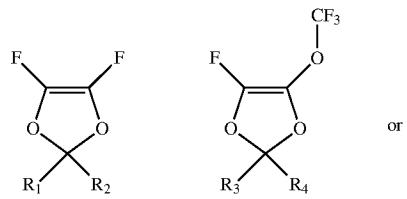

a compound having the structure below that undergoes cyclopolymerization to produce a fluorinated ring

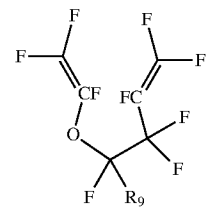

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
And Ry is F, $CF_3$, or $CF_2CF_3$.

8. The separation article of claim 1, wherein the fluorinated dioxolane ring monomer is a single compound.

9. The separation article of claim 1, wherein the fluorinated dioxolane ring monomer is two or more different compounds.

10. The separation article of claim 1, wherein the fluorinated non-dioxolane ring monomer is a single compound.

11. The separation article of claim 1, wherein the fluorinated non-dioxolane ring monomer is two or more different compounds.

12. The separation article of claim 1, wherein the fluorinated dioxolane ring monomer is in the amount of 20 mol % to 80 mol %.

13. The separation article of claim 1, wherein the crosslinker comprises a perfluorinated olefinic compound comprising at least one crosslinkable group.

14. The separation article of claim 13, wherein the crosslinkable group comprises a photoactive group or a thermally active group.

15. The separation article of claim 14, wherein the crosslinkable group comprises an alkyl ester group, a cyano group, or a fluorinated vinyl ether group.

16. The separation article of claim 1, wherein the crosslinker comprises one or more compounds having the structure I:

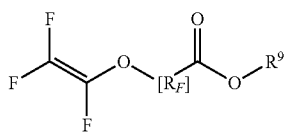

wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

17. The separation article of claim 1, wherein the crosslinker comprises one or more compounds having the structure II:

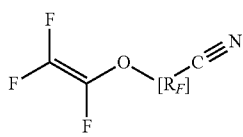

wherein $R_F$ is a perfluoroalkyl group having from 1 to 6 carbon atoms with optionally 1 or 2 ether oxygen atoms.

18. The separation article of claim 1, wherein the crosslinker comprises one or more compounds having the structure III:

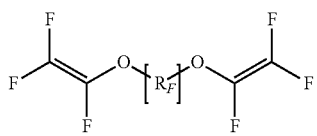

wherein $R_F$ is a perfluoroalkyl group having from 1 to 6 carbon atoms with optionally 1 or 2 ether oxygen atoms.

19. The separation article of claim 1, wherein the crosslinker is a single compound.

20. The separation article of claim 1, wherein the crosslinker is two or more different compounds.

21. The separation article of claim 1, wherein the crosslinker is:

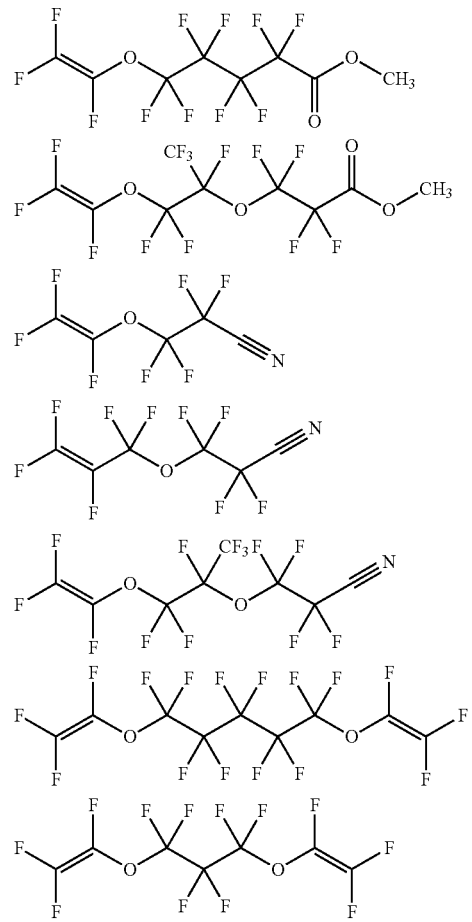

or any combination thereof.

22. The separation article of claim 1, wherein the crosslinker is in the amount of 0.2 mol % to 20 mol %.

23. The separation article of claim 1, wherein the fluorinated dioxolane ring monomer comprises one or more of the following compounds:

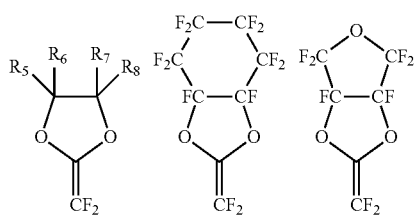

and wherein the fluorinated non-dioxolane ring monomer comprises one or more of the following compounds:

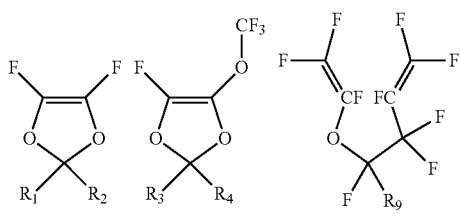

wherein $R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and $R_9$ is F, $CF_3$, or $CF_2CF_3$; and the crosslinker comprises one or more compounds having the following structure:

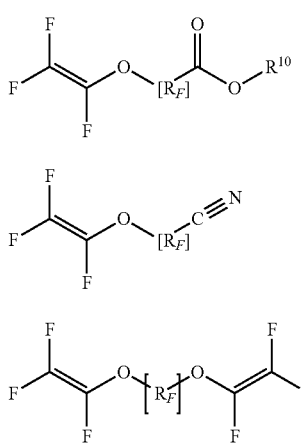

wherein $R_F$ is a perfluoroalkyl group having from 1 to 6 carbon atoms with optionally 1 or 2 ether oxygen atoms, and $R^{10}$ is a linear or branched alkyl group having from 1 to 6 carbon atoms.

24. The separation article of claim 1, wherein the fluorinated dioxolane ring monomer has the structure

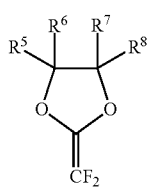

wherein $R^5$, $R^6$, and $R^7$ are F and $R^8$ is $CF_3$, and the fluorinated non-dioxolane ring monomer is

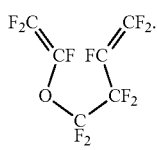

25. The separation article of claim 1, wherein the fluorinated dioxolane ring monomer has the structure

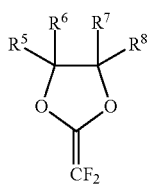

wherein $R^5$, $R^6$, and $R^7$ are F and $R^8$ is $CF_3$, and the fluorinated non-dioxolane ring monomer is

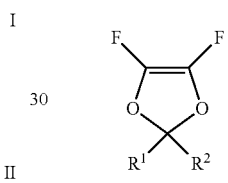

wherein (a) $R^1$ and $R^2$ are $CF_3$ or (b) $R^1$ is F and $R^2$ is $CF_3$.

26. The separation article of claim 1, wherein the first copolymer is produced by solution or aqueous emulsion polymerization.

27. The separation article of claim 1, wherein the copolymerization is conducted in the presence of an initiator.

28. The separation article of claim 27, wherein the initiator comprises a hydrocarbon peroxide, a fluorocarbon peroxide, a hydrocarbon peroxydicarbonate, an inorganic fluorocarbon initiator, or any combination thereof.

29. The separation article of claim 1, wherein the first copolymer is crosslinked by exposing the first copolymer to UV radiation at a wavelength of less than 300 nm.

30. The separation article of claim 1, wherein the first copolymer is crosslinked by exposing the first copolymer to UV radiation at a wavelength of less than 300 nm from about 0.5 hours to about 48 hours.

31. The separation article of claim 1, wherein the first copolymer is crosslinked by exposing the first copolymer to UV radiation at a wavelength of about 250 nm to about 300 nm from about 0.5 hours to about 48 hours.

32. The separation article of claim 1, wherein the first copolymer is crosslinked by heating the first copolymer at a temperature of from about 300° C. to about 350° C. for 0.5 minutes to 60 minutes.

33. The separation article of claim 1, wherein the amorphous fluorinated copolymer is PBVE-co-D1.

34. The separation article of claim 1, wherein the first copolymer has a glass transition temperature of from 110° C. to 300° C.

35. The separation article of claim 1, wherein the first copolymer has a $M_n$ of from 10 kDa to 2,000 kDa.

36. The separation article of claim 1, wherein the first copolymer has a $M_w$ of from 10,000 g/mol to 3,000,000 g/mol.

37. The separation article of claim 1, wherein the separation article comprises a multi-layer structured article, wherein at least one layer of the structure comprises the amorphous fluorinated copolymer.

38. The separation article of claim 1, wherein the separation article comprises a film, membrane, tube, or fiber.

39. The separation article of claim 1, wherein the separation article comprises a layer of the amorphous fluorinated copolymer, wherein the layer has a thickness of less than or equal to 1 µm.

40. A method for separating a first gaseous component from a gaseous mixture said process comprising passing the gaseous mixture across a separation article of claim 1.

41. The method of claim 40, wherein the method comprises
(a) passing the gaseous mixture across a separation article having a feed side and a permeate side, wherein the separation article is selectively permeable to at least the first gaseous component;
(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

42. The method of claim 41, wherein the permeate stream has a concentration of first component that is greater than a concentration of the first component in the retentate stream.

43. The method of claim 41, further comprising withdrawing the permeate stream from the permeate side of the separation article.

44. The method of claim 41, further comprising withdrawing the retentate stream from the feed side of the separation article.

45. The method of claim 41, wherein the first gaseous component is carbon dioxide, hydrogen sulfide, helium, or any combination thereof.

46. The method of claim 41, wherein the gaseous mixture comprises methane and carbon dioxide.

47. The method of claim 41, wherein more than about 50% or more of the first gaseous component in the gaseous mixture permeates through the separation article.

* * * * *